United States Patent
Inoue

(10) Patent No.: US 11,054,531 B2
(45) Date of Patent: Jul. 6, 2021

(54) RADIATION DETECTOR AND RADIATION DETECTING SYSTEM

(71) Applicant: CANON KABUSHIKI KAISHA, Tokyo (JP)

(72) Inventor: Masato Inoue, Toda (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/816,911

(22) Filed: Mar. 12, 2020

(65) Prior Publication Data

US 2020/0209412 A1 Jul. 2, 2020

Related U.S. Application Data

(63) Continuation of application No. PCT/JP2018/033555, filed on Sep. 11, 2018.

(30) Foreign Application Priority Data

Sep. 14, 2017 (JP) .............................. JP2017-176573

(51) Int. Cl.
   *G01T 1/20* (2006.01)
(52) U.S. Cl.
   CPC .................... *G01T 1/2006* (2013.01)
(58) Field of Classification Search
   CPC .................... G01T 1/2006; G01T 1/20181
   See application file for complete search history.

(56) References Cited

U.S. PATENT DOCUMENTS

| | | | |
|---|---|---|---|
| 7,426,260 B2 | 9/2008 | Cantu et al. | |
| 8,431,902 B2 | 4/2013 | Nakatsugawa et al. | |
| 2006/0227933 A1 | 10/2006 | Cantu et al. | |
| 2009/0202043 A1 | 8/2009 | Cantu et al. | |
| 2010/0054418 A1 | 3/2010 | Okada et al. | |
| 2011/0024642 A1* | 2/2011 | Tredwell | H01L 27/14663 250/370.09 |
| 2013/0082184 A1 | 4/2013 | Nakatsugawa et al. | |
| 2013/0126743 A1 | 5/2013 | Iwakiri et al. | |

(Continued)

FOREIGN PATENT DOCUMENTS

| | | |
|---|---|---|
| JP | 2008-516692 A | 5/2008 |
| JP | 2010-56396 A | 3/2010 |

(Continued)

*Primary Examiner* — Kiho Kim
(74) *Attorney, Agent, or Firm* — Venable LLP

(57) ABSTRACT

A radiation detector (1a), which is configured to suitably separate information of a low energy component and information of a high energy component of radiation, includes: a sensor panel (2), which includes a plurality of first photoelectric conversion element portions (23) and second photoelectric conversion element portions (24), which are arranged two-dimensionally; a first scintillator (31) arranged to overlap one surface of the sensor panel (2); a second scintillator (32) arranged to overlap a surface on a side opposite to the one surface of the sensor panel (2); and a light shielding portion (26) arranged outside an effective pixel region (22), in which the plurality of the plurality of first photoelectric conversion element portions (23) and second photoelectric conversion element portions (24) are arranged, and between the first scintillator (31) and the second scintillator (32).

13 Claims, 8 Drawing Sheets

(56) References Cited

U.S. PATENT DOCUMENTS

| | | | | |
|---|---|---|---|---|
| 2013/0126850 A1* | 5/2013 | Iwakiri | ................... | H01L 51/42 |
| | | | | 257/40 |
| 2017/0234993 A1* | 8/2017 | Fujiwara | ................... | G01T 1/20 |
| | | | | 264/21 |
| 2019/0277981 A1* | 9/2019 | Shimizukawa | ......... | G01T 1/208 |

FOREIGN PATENT DOCUMENTS

| JP | 2012-26932 A | 2/2012 |
|---|---|---|
| JP | 2012-112928 A | 6/2012 |
| JP | 2012-233781 A | 11/2012 |
| JP | 2016-156719 A | 9/2016 |

* cited by examiner

RADIATION DETECTOR AND RADIATION DETECTING SYSTEM

CROSS-REFERENCE TO RELATED APPLICATIONS

This application is a Continuation of International Patent Application No. PCT/JP2018/033555, filed Sep. 11, 2018, which claims the benefit of Japanese Patent Application No. 2017-176573, filed Sep. 14, 2017, both of which are hereby incorporated by reference herein in their entirety.

BACKGROUND OF THE INVENTION

Field of the Invention

The present invention relates to a radiation detector and a radiation detecting system.

Description of the Related Art

In taking a radiation image, there is known an energy subtraction method, in which a plurality of radiation images are taken with different energy components, and the plurality of taken radiation images are subjected to difference operation to enable differentiation of an object imaged in the radiation image, for example. In Japanese Patent Application Laid-Open No. 2010-56396, there is disclosed, as a configuration for obtaining radiation images of different energy components by one exposure to radiation without causing a positional offset, a configuration in which wavelength converting portions configured to emit light when radiation enters the wavelength converting portions are provided on one surface and the other surface of a substrate, the light emitted by the wavelength converting portion provided on the one surface is detected by a first photodiode, and the light emitted by the wavelength converting portion provided on the other surface is detected by a second photodiode. In Japanese Patent Application Laid-Open No. 2010-56396, there is also disclosed a configuration in which radiation is allowed to enter from the one surface side to detect a low energy component by the first photodiode, and detect a high energy component by the second photodiode.

In the X-ray detecting element described in Japanese Patent Application Laid-Open No. 2010-56396, the wavelength converting portions are provided also outside a region in which the first photodiode and the second photodiode are provided. With this configuration, light emitted by the wavelength converting layer provided on the one surface may be transmitted through the substrate to enter the wavelength converting portion provided on the other surface, and may be reflected by an interface between the substrate and the wavelength converting portion to enter the second photodiode. As a result, information of the low energy component may be mixed in the radiation image generated of the high energy component detected by the second photodiode. Then, there is a fear that accuracy of differentiating an object may be reduced.

In view of the above-mentioned circumstances, it is a problem to be solved by the present invention to suitably separate, in a radiation detector configured to take radiation images of different energy components, pieces of information of different energy components for the radiation images of the respective energy components.

SUMMARY OF THE INVENTION

In order to solve the above-mentioned problem, according to one embodiment of the present invention, there is provided a radiation detector including: a sensor panel including a plurality of photoelectric conversion element portions arranged two-dimensionally; a first scintillator arranged to overlap one surface of the sensor panel; a second scintillator arranged to overlap a surface on a side opposite to the one surface of the sensor panel; and a light shielding portion arranged outside a region in which the plurality of photoelectric conversion element portions are arranged, and between the first scintillator and the second scintillator.

Further features of the present invention will become apparent from the following description of exemplary embodiments with reference to the attached drawings.

DESCRIPTION OF THE EMBODIMENTS

Now, embodiments of the present invention are described in detail with reference to the drawings.

<Radiation Detector>

Figure 1:
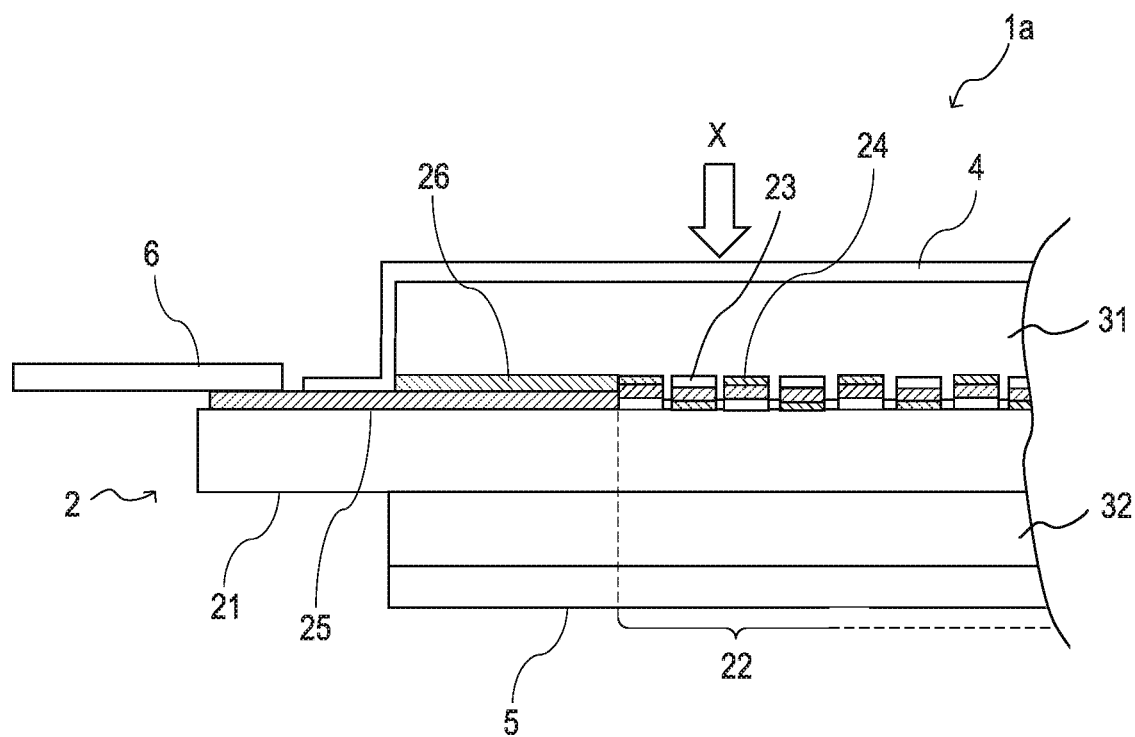
FIG. 1 is a cross-sectional view of a radiation detector according to a first embodiment of the present invention.
Figure 2:
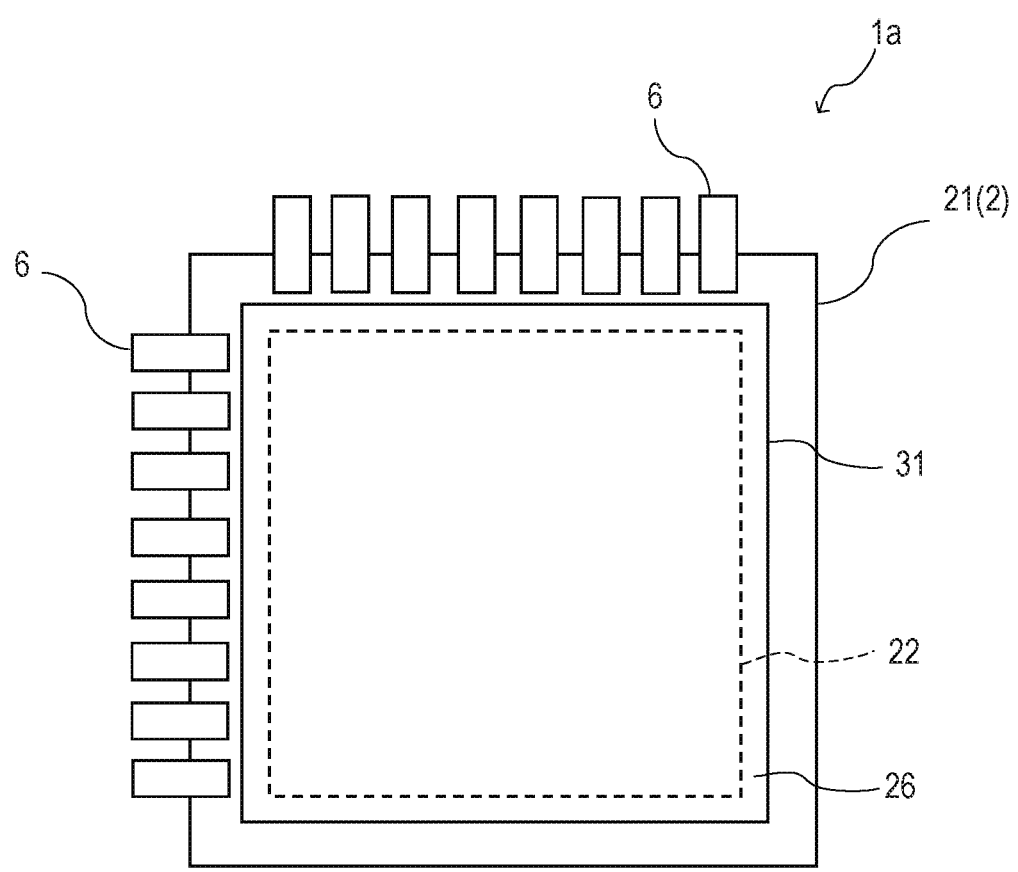
FIG. 2 is a plan view of the radiation detector according to the first embodiment.

First, a radiation detector according to a first embodiment of the present invention is described. FIG. 1 is a cross-sectional view for schematically illustrating a configuration example of a radiation detector 1a according to the first embodiment of the present invention. In FIG. 1, an upper side of FIG. 1 is a side (upstream side of the radiation) radiation is to enter when a radiation image is to be taken. The arrow X of FIG. 1 indicates the radiation to be allowed to enter the radiation detector 1a. FIG. 2 is a plan view for schematically illustrating the configuration example of the radiation detector 1a according to the first embodiment. In FIG. 2, a protection sheet 4 is omitted for description.

The radiation detector 1a according to the first embodiment includes a sensor panel 2, a first scintillator 31, a second scintillator 32, the protection sheet 4, and a base 5. As illustrated in FIG. 1, the first scintillator 31 is arranged to overlap one surface (on the upstream side of radiation X to be allowed to enter) of the sensor panel 2, and the protection sheet 4 configured to cover the first scintillator 31 is further arranged. Further, on a surface (surface on a downstream side of the radiation X to be allowed to enter) opposite to the one surface of the sensor panel 2, the second scintillator 32 is arranged. The second scintillator 32 is supported by the base 5.

The sensor panel 2 includes a glass substrate 21 made of non-alkali glass, for example, and a plurality of photoelectric conversion element portions 23 and 24 arranged two-dimensionally on the glass substrate 21. The plurality of photoelectric conversion element portions 23 and 24 include first photoelectric conversion element portions 23 and second photoelectric conversion element portions 24. Each of the first photoelectric conversion element portions 23 is configured to receive light emitted by the first scintillator 31 and convert the received light into an electric signal (generate an electric signal corresponding to the received light). Each of the second photoelectric conversion element portions 24 is configured to receive light emitted by the second scintillator 32 and convert the received light into an electric signal. Configuration examples of the first photoelectric conversion element portion 23 and the second photoelectric conversion element portion 24 are described later. Further, in the sensor panel 2, a region in which the plurality of photoelectric conversion element portions (first photoelectric conversion element portions 23 and second photoelectric conversion element portions 24) are arranged two-dimensionally is referred to as an "effective pixel region 22". The effective pixel region 22 is a region in which the incident radiation X can be converted into electric signals.

Wirings 25 are also provided in the sensor panel 2. The wirings 25 provided outside the effective pixel region 22 of the sensor panel 2 include, for example, drive lines configured to transmit signals for driving the first photoelectric conversion element portions 23 and the second photoelectric conversion element portions 24, and signal lines configured to read out the electric signals obtained as a result of conversion (generated) by the first photoelectric conversion element portions 23 and the second photoelectric conversion element portions 24. In embodiments of the present invention, the above-mentioned wirings 25 for the first photoelectric conversion element portions 23 and the second photoelectric conversion element portions 24 are provided on one surface of the glass substrate 21 that is on the side of the first scintillator 31. Types and specific configurations of the wirings 25 provided in the sensor panel 2 are not particularly limited. Further, in a peripheral portion of the sensor panel 2, connecting portions 6 configured to transmit/receive signals to/from the outside of the radiation detector 1a are joined. As the connecting portions 6, an FPC is applied, for example, and is configured to electrically connect the wirings 25 provided in the sensor panel 2 to external devices and circuit boards, for example. A configuration of the connecting portions 6 is not particularly limited.

Each of the first scintillator 31 and the second scintillator 32 is configured to emit light (visible light) when the radiation X enters. The first scintillator 31 and the second scintillator 32 are provided to overlap at least the entire effective pixel region 22 as viewed in a direction perpendicular to surfaces of the sensor panel 2 (hereinafter referred to as "plan view"). In other words, as illustrated in FIG. 2, in plan view, an outer periphery (contour) of the first scintillator 31 is located outside an outer periphery of the effective pixel region 22. The same applies for the second scintillator 32. Specific configurations (such as materials and forming methods) of the first scintillator 31 and the second scintillator 32 are not particularly limited, and various known configurations can be applied.

The protection sheet 4 has a function of protecting the first scintillator 31, and is arranged to overlap the first scintillator 31 so as to cover the first scintillator 31. A configuration of the protection sheet 4 is not particularly limited. When the first scintillator 31 is formed of a material that is degraded by moisture, it is preferred that the protection sheet 4 have impermeability in order to protect the first scintillator 31 from moisture. The base 5 is a member configured to support the second scintillator 32. A configuration of the base 5 is not particularly limited.

Outside the effective pixel region 22 of the sensor panel 2, a light shielding portion 26 is arranged. The light shielding portion 26 is configured to prevent light emitted by the first scintillator 31 from entering the second scintillator 32 outside the effective pixel region 22 of the sensor panel 2. As illustrated in FIG. 2, the light shielding portion 26 is arranged outside the effective pixel region 22 so as to surround the effective pixel region 22 in plan view. In the first embodiment, the light shielding portion 26 is arranged in a range from the outer periphery (contour) of the effective pixel region 22 to the outer periphery of the first scintillator 31 in plan view. Therefore, the first scintillator 31 is configured to overlap the light shielding portion 26 outside the effective pixel region 22. It is particularly preferred that the entire portion of the first scintillator 31 that is located outside the effective pixel region 22 be configured to overlap the light shielding portion 26. It is preferred that the light shielding portion 26 be arranged over the entire range without a gap, and have a configuration without a slit or an opening.

Further, the light shielding portion 26 is arranged between the first scintillator 31 and the second scintillator 32 in a lamination direction of the sensor panel 2, the first scintillator 31, and the second scintillator 32. In the first embodiment, as illustrated in FIG. 1, the light shielding portion 26 is arranged to overlap the wirings 25 provided in the sensor panel 2. Stated differently, the light shielding portion 26 is arranged between the wirings 25 and the first scintillator 31. There may be applied a configuration in which the wirings 25 and the light shielding portion 26 do not directly overlap (directly contact with) each other, but have an insulating layer (for example, planarizing film; not shown) made of resin, for example, interposed therebetween.

As the light shielding portion 26, a film made of metal, carbon black, or a resin material, for example, can be applied. It should be noted, however, that the material is not limited as long as the light shielding portion 26 has a light shielding property. Further, there may be applied a configuration in which the light shielding portion 26 is made of the same material as that of a light shielding layer 243 of the second photoelectric conversion element portion 24, which is to be described later. In this case, there may be applied a configuration in which the light shielding portion 26 is formed in conjunction in a step of forming the light shielding layer 243 of the second photoelectric conversion element portion 24.

Figure 3A:
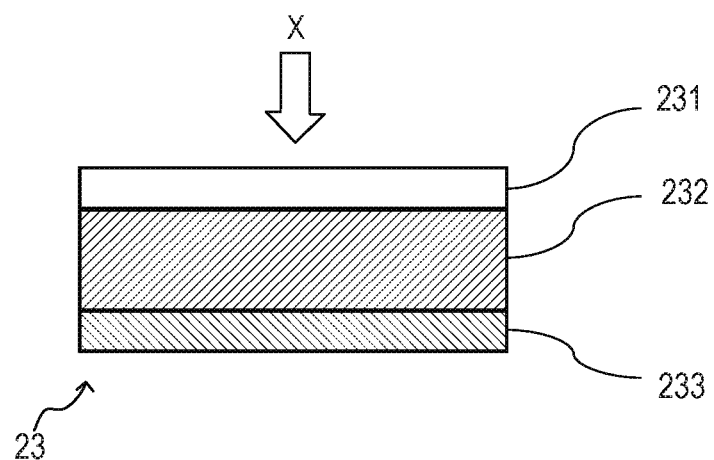
FIG. 3A is a cross-sectional view of a photoelectric conversion element portion.
Figure 3B:
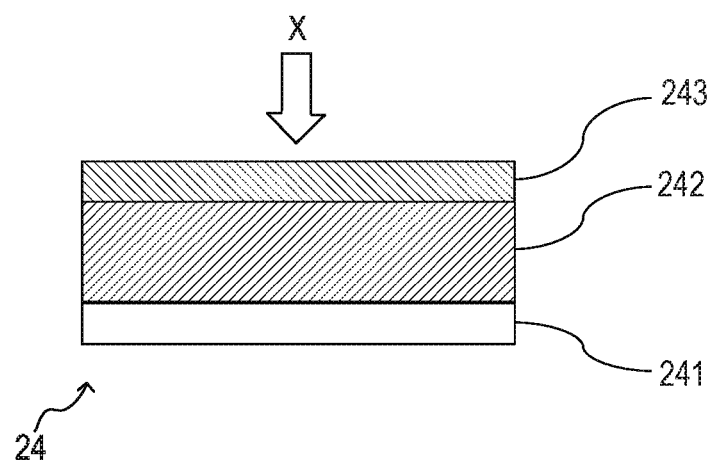
FIG. 3B is a cross-sectional view of a photoelectric conversion element portion.

Next, configuration examples of the first photoelectric conversion element portion 23 and the second photoelectric conversion element portion 24, which form the effective pixel region 22, are described. The effective pixel region 22 is formed of the same number or substantially the same number of first photoelectric conversion element portions 23 and second photoelectric conversion element portions 24, for example. In the effective pixel region 22, the plurality of first photoelectric conversion element portions 23 and the plurality of second photoelectric conversion element portions 24 are arranged alternately, for example. FIG. 3A is a cross-sectional view for schematically illustrating a configuration example of a first photoelectric conversion element portion 23, and FIG. 3B is a cross-sectional view for schematically illustrating a configuration example of a second photoelectric conversion element portion 24. In FIG. 3A and FIG. 3B, the upper side of the figures is a side on which the first scintillator 31 is arranged (upstream side of the radiation X to be allowed to enter), and the lower side thereof is a side on which the glass substrate 21 and the second scintillator 32 are arranged. Further, the arrow X indicates the radiation to be allowed to enter during imaging. As illustrated in FIG. 3A and FIG. 3B, each of the first photoelectric conversion element portion 23 and the second photoelectric conversion element portion 24 includes a light transmitting layer 231, 241, a photoelectric conversion layer 232, 242, and the light shielding layer 233, 243.

The light transmitting layer 231, 241 is a layer configured to transmit light emitted by the first scintillator 31 and the second scintillator 32. For the light transmitting layer 231, 241, indium tin oxide (ITO) or other transparent metal compound or a transparent resin material can be applied, for example. It should be noted, however, that it is only required that the light transmitting layer 231, 241 have a light transmitting property, and a specific material and configuration thereof are not particularly limited. The light shielding layer 233, 243 is a layer configured to shield light emitted by the first scintillator 31 and the second scintillator 32. As the light shielding layer 233, 243, metal, carbon black, or a resin material can be applied, for example.

The photoelectric conversion layer 232 of the first photoelectric conversion element portion 23 is a layer in which a photoelectric conversion element (not shown) configured to convert light emitted by the first scintillator 31 into an electric signal (generate an electric signal corresponding to the light) is arranged. The photoelectric conversion layer 242 of the second photoelectric conversion element portion 24 is a layer in which a photoelectric conversion element (not shown) configured to convert light emitted by the second scintillator 32 into an electric signal (generate an electric signal) is arranged. The photoelectric conversion layer 232 of the first photoelectric conversion element portion 23 and the photoelectric conversion layer 242 of the second photoelectric conversion element portion 24 have the same configuration. The photoelectric conversion layer 232, 242 includes a photodiode or other photoelectric conversion element configured to generate an electric signal (electric charges) when light enters, and a TFT or other switching element configured to extract the electric signal from the photoelectric conversion element, for example. The photoelectric conversion layer 232, 242 further includes a drive line configured to transmit a drive signal for the switching element, a signal line configured to transmit the electric signal extracted from the photoelectric conversion element, a bias line configured to apply a bias to the photoelectric conversion element, and other predetermined layers (gate insulating film and planarizing film). The photoelectric conversion layer 232, 242 is formed through repeating a photoetching process to form the photoelectric conversion element, the switching element, the wirings, and the like. A specific configuration of the photoelectric conversion layer 232, 242 is not particularly limited, and the same configuration as in various known radiation detection panels can be applied.

As illustrated in FIG. 3A, the first photoelectric conversion element portion 23 has a configuration in which the light shielding layer 233, the photoelectric conversion layer 232, and the light transmitting layer 231 are arranged to overlap one another in the stated order from the side (lower side of FIG. 3A) closer to the second scintillator 32. Meanwhile, as illustrated in FIG. 3B, the second photoelectric conversion element portion 24 has a configuration in which the light transmitting layer 241, the photoelectric conversion layer 242, and the light shielding layer 243 are arranged to overlap one another in the stated order from the side (lower side of FIG. 3B) closer to the second scintillator 32. In other words, in the first photoelectric conversion element portion 23, the light transmitting layer 231 is arranged on the side closer to the first scintillator 31, the light shielding layer 233 is arranged on the side closer to the second scintillator 32, and the photoelectric conversion layer 232 is arranged therebetween. Meanwhile, in the second photoelectric conversion element portion 24, the light shielding layer 243 is arranged on the side closer to the first scintillator 31, the light transmitting layer 241 is arranged on the side closer to the second scintillator 32, and the photoelectric conversion layer 242 is arranged therebetween.

With the above-mentioned configuration, light emitted by the first scintillator 31 is transmitted through the light transmitting layer 231 of the first photoelectric conversion element portion 23 to enter the photoelectric conversion layer 232 of the first photoelectric conversion element portion 23. Meanwhile, light emitted by the second scintillator 32 is shielded by the light shielding layer 233 of the first photoelectric conversion element portion 23, and hence does not enter the photoelectric conversion layer 232 of the first photoelectric conversion element portion 23. Therefore, the first photoelectric conversion element portion 23 is configured to receive (detect) light emitted by the first scintillator 31 and convert the light into the electric signal.

Further, light emitted by the first scintillator 31 is shielded by the light shielding layer 243 of the second photoelectric conversion element portion 24, and hence does not enter the photoelectric conversion layer 242 of the second photoelectric conversion element portion 24. Meanwhile, light emitted by the second scintillator 32 is transmitted through the light transmitting layer 241 of the second photoelectric conversion element portion 24 to enter the photoelectric conversion layer 242 of the second photoelectric conversion element portion 24. Therefore, the second photoelectric conversion element portion 24 is configured to receive (detect) light emitted by the second scintillator 32 and convert the light into the electric signal.

When a radiation image is to be taken with the use of the radiation detector 1a, the radiation X is allowed to enter from the first scintillator 31 side. A low energy component (soft radiation) of low frequency included in the radiation X is hard to be transmitted through an object, and a high energy component (hard radiation) of high frequency is easy to be transmitted through an object. Therefore, when the radiation X enters from the first scintillator 31 side, the low energy component of the radiation X is converted into light in the first scintillator 31. Then, the light obtained as a result of the conversion is converted into the electric signal in the photoelectric conversion layer 232 of the first photoelectric conversion element portion 23. The high energy component of the radiation X is transmitted through the first scintillator 31 and the sensor panel 2 to enter the second scintillator 32. Then, the high energy component of the radiation X is converted into light in the second scintillator 32, and then converted into the electric signal in the photoelectric conversion layer 232 of the second photoelectric conversion element portion 24. It should be noted, however, that the low energy component is absorbed by the first scintillator 31 and the sensor panel 2, and does not reach the second scintillator 32. Therefore, information of the low energy component of the radiation X is not mixed in the electric signal obtained by the conversion in the second photoelectric conversion element portion 24.

As described above, when a radiation image is taken with the use of the radiation detector 1a, the radiation X is allowed to enter from the first scintillator 31 side. As a result, the low energy component of the radiation X can be detected by the first photoelectric conversion element portions 23 to generate a radiation image of the low energy component, and the high energy component of the radiation X can be detected by the second photoelectric conversion element portion 24 to generate a radiation image of the high energy component. In other words, the radiation detector 1a can generate two radiation images of different energy components in one exposure to radiation.

Further, the information of the low energy component is prevented from being mixed in the radiation image of the high energy component by the light shielding portion 26. In other words, in a configuration in which the light shielding portion 26 is not arranged, light emitted by the first scintillator 31 enters the second scintillator 32, and is reflected by an interface between the second scintillator 32 and the base 5, for example, to enter the photoelectric conversion layer 242 of the second photoelectric conversion element portion 24 outside the effective pixel region 22. As a result, particularly in a region close to the outer periphery of the effective pixel region 22, the information of the low energy component is mixed in the radiation image of the high energy component. The mixed information of the low energy component may become noise to reduce accuracy of differentiating the object.

In contrast, according to the first embodiment of the present invention, light emitted by the first scintillator 31 is prevented from entering the second scintillator 32 by the light shielding portion 26 outside the effective pixel region 22. Therefore, it is possible to prevent the information of the low energy component from being mixed in the radiation image of the high energy component, and hence to prevent noise from being mixed in the radiation image of the high energy component.

Next, a method of manufacturing the sensor panel 2 and a method of forming the light shielding portion 26 are described. First, on the one surface of the glass substrate 21, the light shielding layers 233 of the first photoelectric conversion element portions 23 are formed, and the light transmitting layers 241 of the second photoelectric conversion element portions 24 are formed. A method of forming the light shielding layers 233 and a method of forming the light transmitting layers 241 are not particularly limited, and various known film forming methods can be applied. Similarly, the order in which the light shielding layers 233 of the first photoelectric conversion element portions 23 and the light transmitting layers 241 of the second photoelectric conversion element portions 24 are formed is not particularly limited.

After the light shielding layers 233 of the first photoelectric conversion element portions 23 and the light transmitting layers 241 of the second photoelectric conversion element portions 24 are formed, the photoelectric conversion layers 232 and 242 are formed thereon, respectively. The photoelectric conversion layers 232 and 242 are formed through repeating the photoetching process to form the photoelectric conversion elements, the switching elements, the insulating films, and the like. Also in the step of forming the photoelectric conversion layers 232 and 242, the above-mentioned wirings 25 (signal lines and drive lines) are formed outside the effective pixel region 22 in conjunction. The method of forming the photoelectric conversion layers 232 and 242 and the wirings 25 is not particularly limited, and a known method can be applied.

Then, the light transmitting layers 231 are formed to overlap the surfaces of the photoelectric conversion layers 232 of the first photoelectric conversion element portions 23, and the light shielding layers 243 are formed to overlap the surfaces of the photoelectric conversion layers 242 of the second photoelectric conversion element portions 24. A method of forming the light shielding layers 243 and a method of forming the light transmitting layers 231 are not particularly limited, and various known film forming methods can be applied. Similarly, the order in which the light transmitting layers 231 of the first photoelectric conversion element portions 23 and the light shielding layers 243 of the second photoelectric conversion element portions 24 are formed is not particularly limited. Then, in the step of forming the light shielding layers 243 to overlap the surfaces of the photoelectric conversion layers 242 of the second photoelectric conversion element portions 24, the light shielding portion 26 is formed outside the effective pixel region 22 in conjunction. As a result, the light shielding portion 26 is formed of the same material and in the same step as the light shielding layers 243 of the second photoelectric conversion element portions 24 outside the effective pixel region 22. Further, with this configuration, the light shielding portion 26 can be arranged to overlap the wirings 25 provided outside the effective pixel region 22. Therefore, the light shielding portion 26 can be arranged between the wirings 25 of the sensor panel 2 and the first scintillator 31.

Figure 4A:
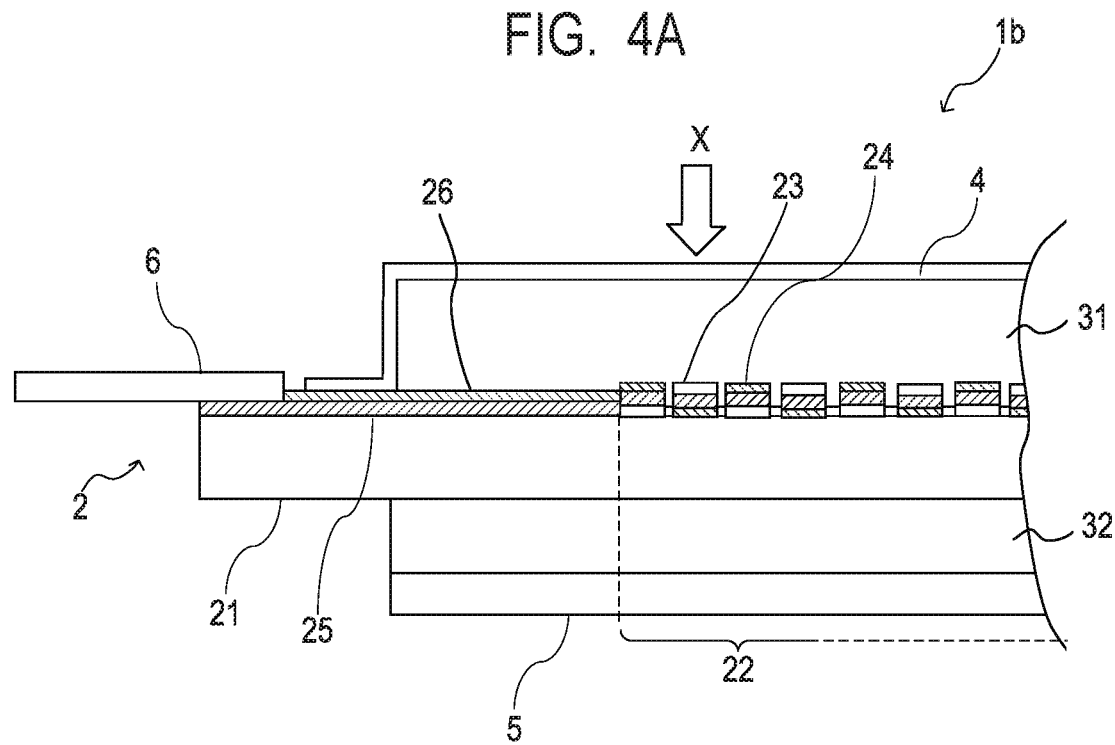
FIG. 4A is a cross-sectional view and a plan view of a radiation detector according to a second embodiment of the present invention.
Figure 4B:
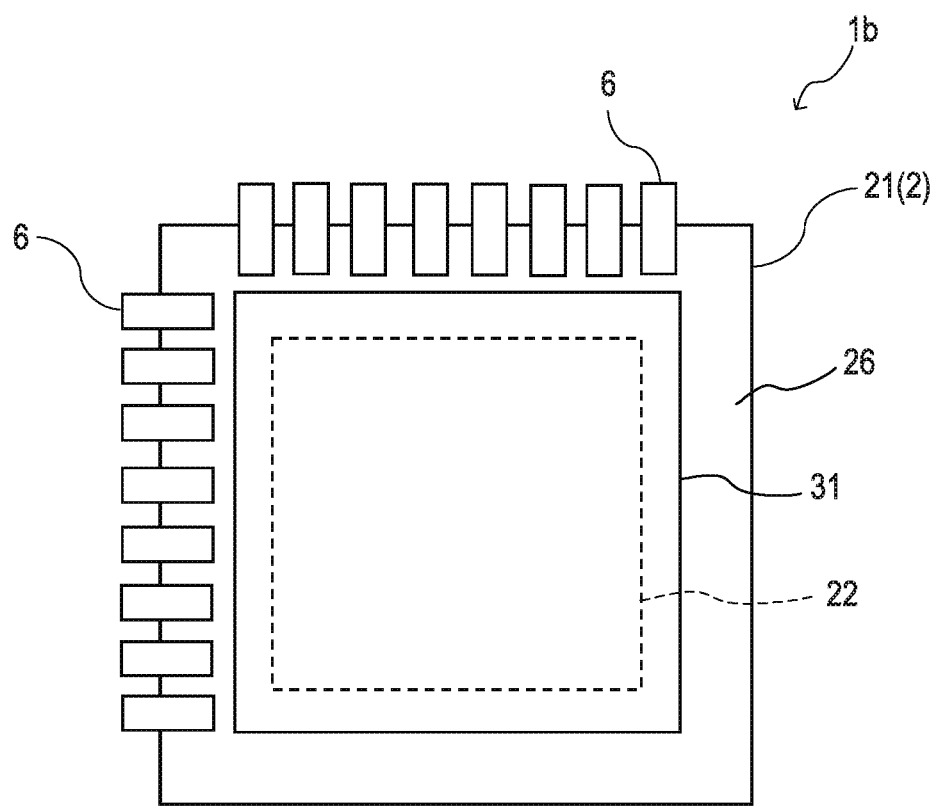
FIG. 4B is a cross-sectional view and a plan view of the radiation detector according to the second embodiment.

Next, a radiation detector 1b according to a second embodiment of the present invention is described. In the first embodiment described above, the configuration in which the light shielding portion 26 is arranged outside the effective pixel region 22 and in the range overlapping the first scintillator 31 has been described, but the configuration of the light shielding portion 26 is not limited to the configuration described in the first embodiment. FIG. 4A is a cross-sectional view for schematically illustrating a configuration example of the radiation detector 1b according to the second embodiment. FIG. 4B is a plan view for schematically illustrating the configuration example of the radiation detector 1b according to the second embodiment. In FIG. 4B, a protection sheet 4 is omitted. Further, components common to those of the first embodiment are denoted by the same reference symbols as in the first embodiment, and a description thereof is omitted. As illustrated in FIG. 4A and FIG. 4B, in the radiation detector 1b according to the second embodiment, the light shielding portion 26 is provided to the outer peripheral edge of the sensor panel 2 so as to surround the effective pixel region 22. Stated differently, the light shielding portion 26 is provided in a range between the outer periphery (contour) of the effective pixel region 22 and the outer peripheral edge of the glass substrate 21 in plan view. It should be noted, however, that the light shielding portion 26 is provided to avoid the connecting portions 6. Also with this configuration, effects similar to those obtained in the first embodiment can be obtained. The method of forming the light shielding portion 26 may be the same as in the first embodiment.

Figure 5:
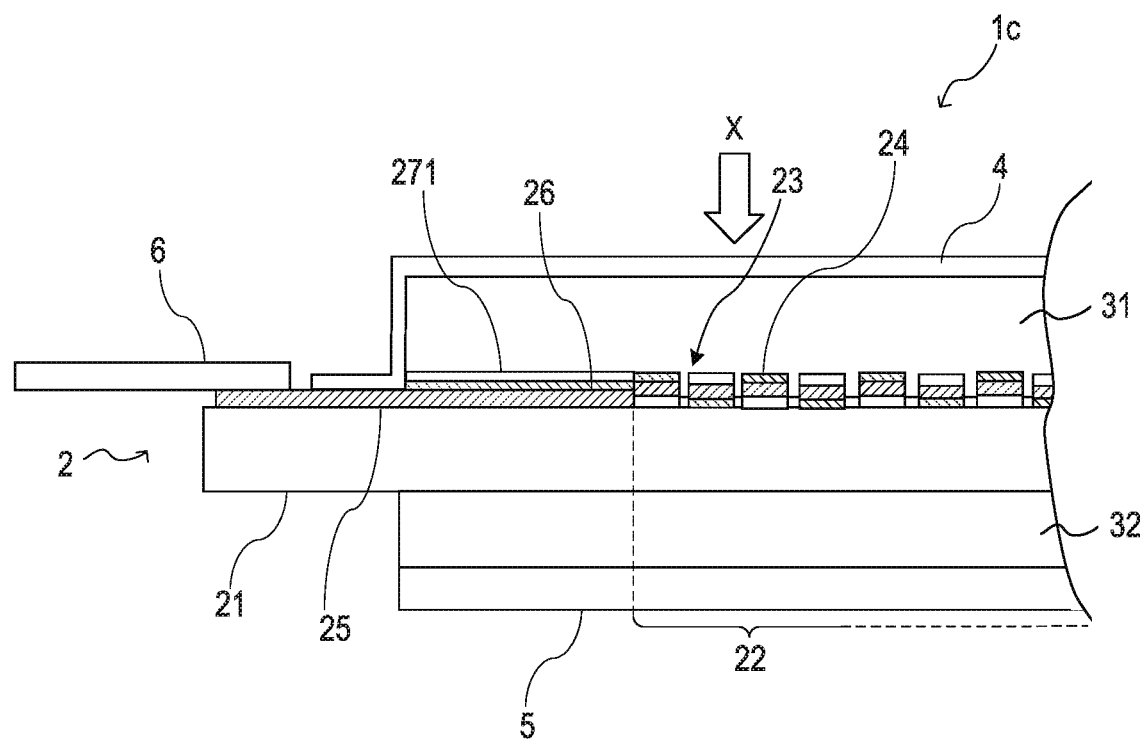
FIG. 5 is a cross-sectional view of a radiation detector according to a third embodiment of the present invention.

FIG. 5 is a cross-sectional view for schematically illustrating a configuration example of a radiation detector 1c according to a third embodiment of the present invention. As illustrated in FIG. 5, outside the effective pixel region 22, the light shielding portion 26 is arranged to overlap the wirings 25 of the sensor panel 2, and a first light antireflection portion 271 is further arranged to overlap the light shielding portion 26. The first light antireflection portion 271 is a layer with low light reflectance. The first light antireflection portion 271 also has low light transmissivity. In other words, it is preferred that the first light antireflection portion 271 have a configuration of absorbing light emitted by the first scintillator 31 without reflecting or transmitting the light. With this configuration, light emitted from the first scintillator 31 is prevented from reaching and being reflected by the light shielding portion 26. Therefore, noise caused by light reflected by the light shielding portion 26 can be prevented. In particular, when the light shielding portion 26 is made of metal, for example, and has high light reflectance, it is preferred to adopt the configuration in which the first light antireflection portion 271 is arranged. A material of the first light antireflection portion 271 is not particularly limited, but carbon black or resin colored in black can be applied, for example. A specific material of the first light antireflection portion 271 is not particularly limited, but it is preferred that the first light antireflection portion 271 be made of a material having a light reflectance that is lower than that of the light shielding portion 26.

In FIG. 5, there is illustrated the configuration in which the light shielding portion 26 and the light antireflection portion 271 are arranged in the same range as that of the light shielding portion 26 in the first embodiment, but there may be adopted a configuration in which the light shielding portion 26 and the light antireflection portion 271 are arranged in the same range as that of the light shielding portion 26 in the second embodiment.

Figure 6:
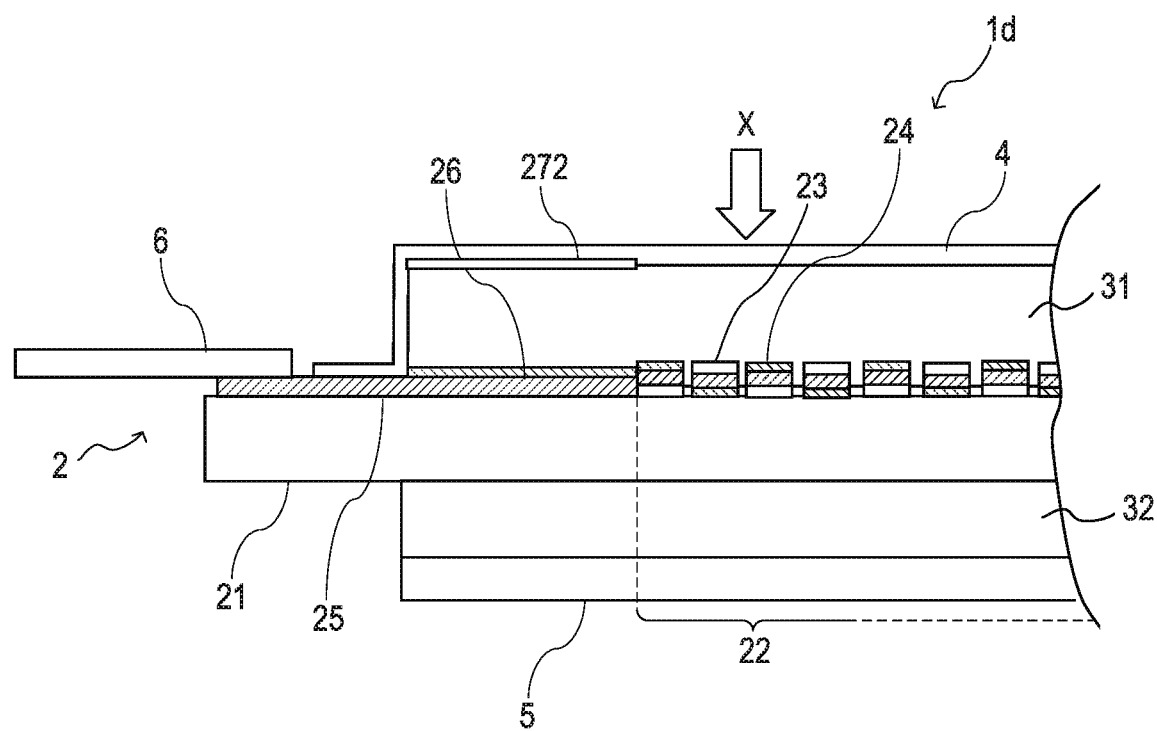
FIG. 6 is a cross-sectional view of a radiation detector according to a fourth embodiment of the present invention.

Next, a configuration example of a radiation detector 1*d* according to a fourth embodiment of the present invention is described. FIG. 6 is a cross-sectional view for schematically illustrating the configuration example of the radiation detector 1*d* according to the fourth embodiment of the present invention. In the radiation detector 1*d* according to the fourth embodiment, a second light antireflection portion 272 is arranged outside the effective pixel region 22, and between the first scintillator 31 and the protection sheet 4. The second light antireflection portion 272 is a layer having low light reflectance. In particular, a configuration with a light reflectance that is lower than that of the protection sheet 4 is applied. With this configuration, light emitted by the first scintillator 31 is prevented from being reflected by the protection sheet 4 and entering the photoelectric conversion layers 232 of the first photoelectric conversion element portions 23 outside the effective pixel region 22. Therefore, noise caused by the reflection of light by the protection sheet 4 can be prevented. A material of the second light antireflection portion 272 is not particularly limited, and carbon black or a resin material colored in black can be applied as with the first light antireflection portion 271, for example. Further, it is preferred that the second light antireflection portion 272 be configured to be arranged over the entire range outside the effective pixel region 22 without a gap in plan view.

Figure 7:
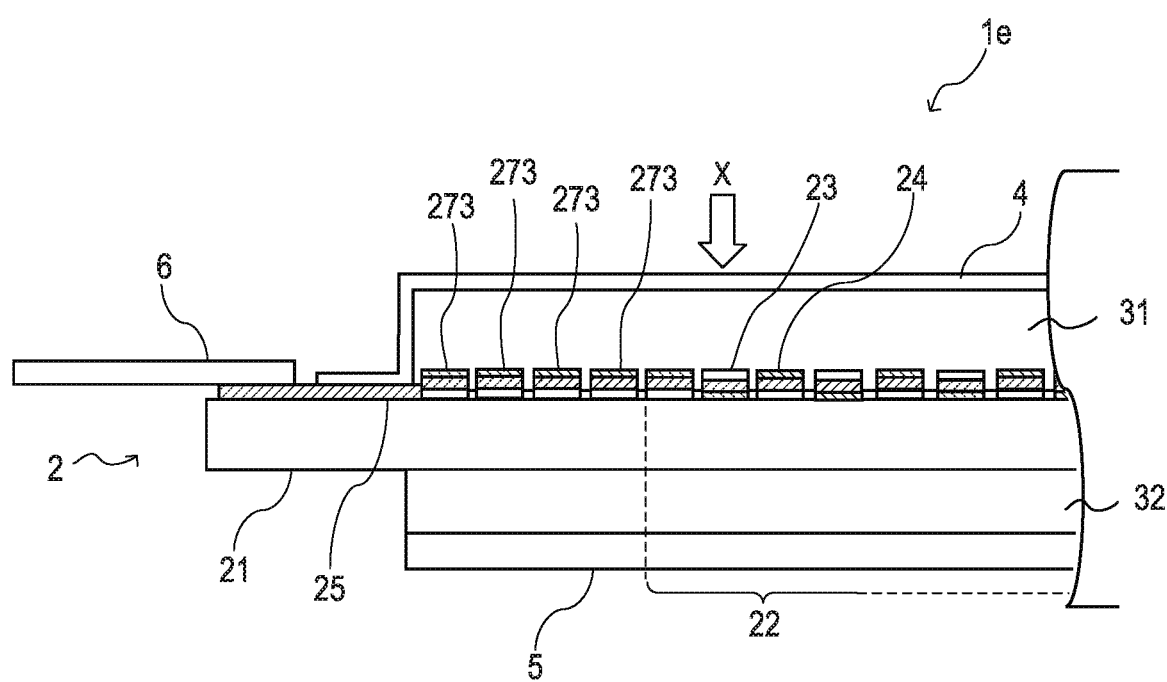
FIG. 7 is a cross-sectional view of a radiation detector according to a fifth embodiment of the present invention.

Next, a configuration example of a radiation detector 1*e* according to a fifth embodiment of the present invention is described. FIG. 7 is a cross-sectional view for schematically illustrating the configuration example of the radiation detector 1*e* according to the fifth embodiment of the present invention. In the radiation detector 1*e* according to the fifth embodiment, a plurality of third photoelectric conversion element portions 273 are arranged outside the effective pixel region 22. The third photoelectric conversion element portions 273 are not used for acquiring image information in taking a radiation image. For the third photoelectric conversion element portions 273, the same configuration as that of the second photoelectric conversion element portion 24 can be applied. In other words, the light shielding layer 243 is provided on the first scintillator 31 side of the photoelectric conversion layer 242 of the third photoelectric conversion element portion 273. Alternatively, there may be adopted a configuration in which light shielding layers are arranged on both the first scintillator 31 side and the second scintillator 32 side of the third photoelectric conversion element portion 273, and in which a photoelectric conversion layer is arranged between the light shielding layers. With this configuration, the third photoelectric conversion element portions 273 have a function similar to that of the light shielding portion 26 of the first embodiment. Therefore, effects similar to those obtained in the first embodiment can be obtained.

The third photoelectric conversion element portions 273 may not have a configuration of being arranged over the entire range from the outer periphery of the effective pixel region 22 to the outer periphery of the first scintillator 31 in plan view, but may have a configuration of being arranged in a part of the range. In this case, there may be adopted a configuration in which, in a region other than the region in which the third photoelectric conversion element portions 273 are arranged, the light shielding portion 26 having the same configuration as in the first embodiment and the second embodiment is arranged. In this manner, it is only required that the third photoelectric conversion element portions 273 form at least a part of the light shielding portion 26. For example, there may be applied a configuration in which the plurality of third photoelectric conversion element portions 273 are arranged to surround the outside of the effective pixel region 22, and the same light shielding portion 26 as in the first embodiment and the second embodiment is arranged outside the plurality of third photoelectric conversion element portions 273 in plan view. Also with this configuration, effects similar to those obtained in the first embodiment can be obtained.

Further, according to the fifth embodiment, the first light antireflection portion 271 may be arranged to overlap the light shielding layers 243 of the third photoelectric conversion element portions 273 as in the third embodiment. Further, as in the fourth embodiment, the second light antireflection portion 272 may be arranged outside the effective pixel region 22, and between the first scintillator 31 and the protection sheet 4.

<Radiation Detecting System>

Figure 8:
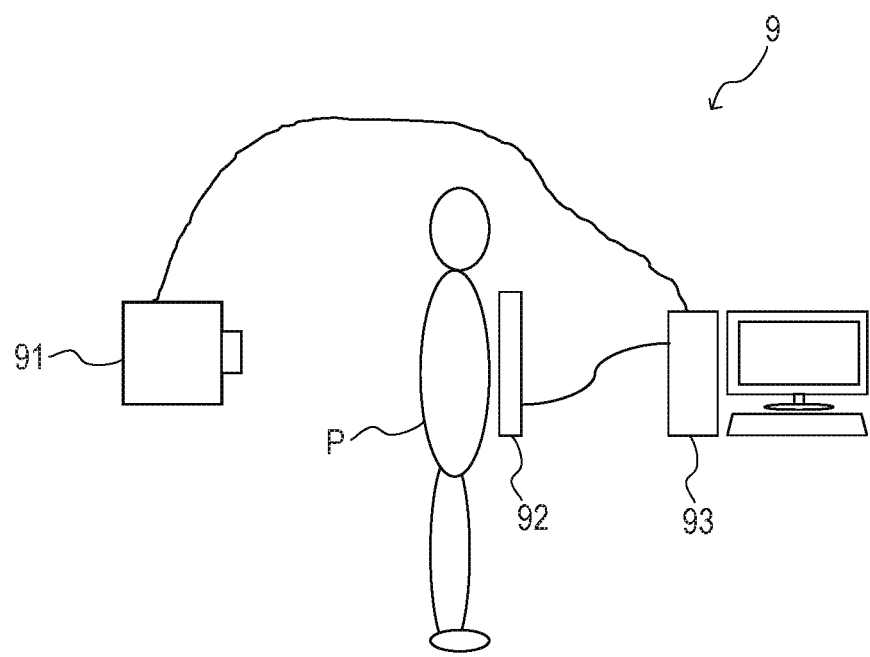
FIG. 8 is a schematic diagram of a radiation detecting system.

Next, a radiation detecting system 9 according to an embodiment of the present invention is described. FIG. 8 is a diagram for schematically illustrating a configuration example of the radiation detecting system 9 according to the embodiment of the present invention. As illustrated in FIG. 8, the radiation detecting system 9 includes a radiation generating apparatus 91, a radiation detecting apparatus 92, and a control/arithmetic processing unit 93. The radiation generating apparatus 91 is configured to perform radiation exposure under control of the control/arithmetic processing unit 93. A configuration of the radiation generating apparatus 91 is not particularly limited, and various known radiation generating apparatus can be applied. The radiation detecting apparatus 92 is configured to detect radiation to which a subject P as an object is exposed by the radiation generating apparatus 91 and which has been transmitted through the subject P, and generate a radiation image to be output to the control/arithmetic processing unit 93 under control of the control/arithmetic processing unit 93. The control/arithmetic processing unit 93 performs predetermined arithmetic processing on the radiation image acquired from the radiation detecting apparatus 92. As a result, a user of the radiation detecting system 9, for example, can diagnose the subject P.

As the radiation detecting apparatus 92, the radiation detector 1a, 1b, 1c, 1d, 1e according to the embodiments of the present invention described above is applied. For example, the radiation detecting apparatus 92 includes the radiation detector 1a, 1b, 1c, 1d, 1e and a battery serving as a supply source of electric power for driving the radiation detector 1a, 1b, 1c, 1d, 1e, which are contained in a housing. As the control/arithmetic processing unit 93, a computer including a CPU, a ROM, and a RAM can be applied, for example. In this case, computer programs for controlling the radiation generating apparatus 91 and the radiation detecting apparatus 92 is stored in advance in the ROM. Then, the CPU reads out the computer programs stored in the ROM, and loads the computer programs onto the RAM to execute the computer programs. As a result, the control/arithmetic processing unit 93 serves as control means for controlling the radiation generating apparatus 91 and the radiation detecting apparatus 92. The control/arithmetic processing unit 93 also serves as signal processing means for executing predetermined arithmetic processing on the radiation image (image signal) acquired from the radiation detecting apparatus 92.

Further, the radiation detecting system 9 according to the embodiment of the present invention can acquire two radiation images of different energy components by one exposure to radiation (one-shot energy subtraction method). Specifically, the control/arithmetic processing unit 93 controls the radiation generating apparatus 91 to expose the subject P (object) to radiation once. Then, the radiation detecting apparatus 92 detects the low energy component of the radiation X to generate the image of the low energy component with the first photoelectric conversion element portions 23, and detects the high energy component of the radiation X to generate the image of the high energy component with the second photoelectric conversion element portions 24. The control/arithmetic processing unit 93 serves as the signal processing means to acquire the radiation image of the high energy component and the radiation image of the low energy component, which have been generated by the radiation detecting apparatus 92, and performs arithmetic processing of taking differences between the radiation image of the high energy component and the radiation image of the low energy component, which have been acquired. As a result, the control/arithmetic processing unit 93 can obtain an image (referred to as "energy subtraction image") in which one of hard tissues and soft tissues is emphasized and the other is removed, for example. In this manner, the radiation detecting system 9 according to the embodiment of the present invention can generate a new radiation image (energy subtraction image) based on the plurality of radiation images (the radiation image of the low energy component and the radiation image of the high energy component) acquired in one exposure to radiation.

The processing of generating the energy subtraction image may be executed by the radiation detecting apparatus 92. For example, in the radiation detecting apparatus 92, a computer including a CPU, a ROM, and a RAM is connected to the radiation detector 1a, 1b, 1c, 1d, 1e through the connecting portions 6. In the ROM of the computer, computer programs for executing control on the radiation detector 1a, 1b, 1c, 1d, 1e and processing of generating the energy subtraction image are stored in advance. Then, the CPU reads out the computer programs stored in the ROM, and loads the computer programs onto the RAM to execute the computer programs. As a result, the computer serves as control means for controlling the radiation detector 1a, 1b, 1c, 1d, 1e, and controls the radiation detector 1a, 1b, 1c, 1d, 1e in accordance with instructions from the control/arithmetic processing unit 93. Further, the computer serves as arithmetic processing means for executing processing of generating a new radiation image based on a plurality of radiation images acquired in one exposure to radiation. As a result, the energy subtraction image is generated in the radiation detecting apparatus 92.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention relates to a technology suitable for a radiation detecting apparatus and a radiation detecting system. In addition, according to the present invention, it is possible to suitably separate, in a radiation detector configured to take radiation images of different energy components, pieces of information of different energy components for the radiation images of the respective energy components.

The present invention is described above referring to the embodiments. However, the present invention is not limited to the above-mentioned embodiments. The present invention also encompasses the invention modified within a scope not deviated from the gist of the present invention, and the invention equivalent to the present invention. Further, the above-mentioned embodiments and modification examples may be combined with each other as appropriate within the scope not deviated from the gist of the present invention.

According to the present invention, it is possible to suitably separate, in the radiation detector configured to take radiation images of different energy components, pieces of information of different energy components for the radiation images of the respective energy components.

Further features of the present invention will become more apparent through the following embodiments to be described with reference to the drawings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A radiation detector comprising:
a sensor panel including a plurality of photoelectric conversion element portions arranged two-dimensionally;
a first scintillator arranged to overlap one surface of the sensor panel;
a second scintillator arranged to overlap a surface on a side opposite to the one surface of the sensor panel; and
a light shielding portion arranged outside a region in which the plurality of photoelectric conversion element portions are arranged, and between the first scintillator and the second scintillator.

2. The radiation detector according to claim 1,
wherein, as viewed in a direction perpendicular to surfaces of the sensor panel, an outer periphery of the first scintillator is located outside an outer periphery of the region in which the plurality of photoelectric conversion element portions are arranged, and
wherein the light shielding portion is arranged in a range from the outer periphery of the region in which the plurality of photoelectric conversion element portions are arranged to the outer periphery of the first scintillator.

3. The radiation detector according to claim 1, wherein the light shielding portion is arranged in a range from an outer periphery of the region in which the plurality of photoelectric conversion element portions are arranged to an outer periphery of the sensor panel.

4. The radiation detector according to claim 1, further comprising a plurality of other photoelectric conversion element portions, which are arranged outside the region of the sensor panel in which the plurality of photoelectric conversion elements are arranged, and separately from the plurality of photoelectric conversion element portions,
wherein each of the plurality of other photoelectric conversion element portions includes a light shielding layer, and
wherein the light shielding layer of each of the plurality of other photoelectric conversion element portions forms at least a part of the light shielding portion.

5. The radiation detector according to claim 1, wherein each of the plurality of photoelectric conversion element portions includes a photoelectric conversion layer configured to convert incident light into an electric signal, and a light shielding layer arranged to overlap the photoelectric conversion layer, and
wherein the light shielding portion is formed of the same material as a material of the light shielding layer.

6. The radiation detector according to claim 1, wherein the plurality of photoelectric conversion element portions are arranged on one surface of a substrate of the sensor panel,
wherein the first scintillator is arranged to overlap a side of the sensor panel on which the plurality of photoelectric conversion element portions are arranged, and
wherein the light shielding portion is arranged between the sensor panel and the first scintillator.

7. The radiation detector according to claim 6, further comprising signal lines configured to extract electric signals from the plurality of photoelectric conversion element portions, the signal lines being arranged outside the region of the sensor panel in which the plurality of photoelectric conversion element portions are arranged, and on a surface on the same side as the side on which the plurality of photoelectric conversion element portions are arranged,
wherein the light shielding portion is arranged to overlap the first scintillator side of the signal lines.

8. The radiation detector according to claim 7, further comprising a second antireflection portion configured to prevent reflection of light emitted by the first scintillator, the second antireflection portion being arranged on a side of the first scintillator opposite to the sensor panel, and outside the region in which the plurality of photoelectric conversion element portions are arranged as viewed in a direction perpendicular to surfaces of the sensor panel.

9. The radiation detector according to claim 6, further comprising a first antireflection portion configured to prevent reflection of light emitted by the first scintillator, the first antireflection portion being arranged between the light shielding portion and the first scintillator.

10. The radiation detector according to claim 9, further comprising a second antireflection portion configured to prevent reflection of light emitted by the first scintillator, the second antireflection portion being arranged on a side of the first scintillator opposite to the sensor panel, and outside the region in which the plurality of photoelectric conversion element portions are arranged as viewed in a direction perpendicular to surfaces of the sensor panel.

11. The radiation detector according to claim 1, wherein the plurality of photoelectric conversion element portions include a first photoelectric conversion element portion configured to receive light emitted by the first scintillator and convert the received light into an electric signal, and a second photoelectric conversion element portion configured to receive light emitted by the second scintillator and convert the received light into an electric signal.

12. The radiation detector according to claim 11,
wherein the first photoelectric conversion element portion includes a photoelectric conversion layer configured to convert the light emitted by the first scintillator into the electric signal, and a light shielding layer arranged to overlap the second scintillator side of the photoelectric conversion layer and shield the light emitted by the second scintillator, and
wherein the second photoelectric conversion element portion includes a photoelectric conversion layer configured to convert the light emitted by the second scintillator into an electric signal, and a light shielding layer arranged to overlap the first scintillator side of the photoelectric conversion layer and shield the light emitted by the first scintillator.

13. A radiation detecting system comprising:
the radiation detector of claim 1; and
signal processing means for processing an electric signal obtained by the radiation detector.

* * * * *